Aug. 15, 1950  L. A. PAINE ET AL  2,518,928
GREASE-DAMPENED POINTER
Filed April 20, 1946

INVENTORS:
Louis A. Paine
and Richard A. Road
BY Louis Robertson
Att'y

Patented Aug. 15, 1950

2,518,928

UNITED STATES PATENT OFFICE 2,518,928

GREASE-DAMPENED POINTER

Louis A. Paine and Richard A. Road, West Lafayette, Ind., assignors to Duncan Electric Manufacturing Company, La Fayette, Ind., a corporation of Illinois Application April 20, 1946, Serial No. 663,740

5 Claims. (Cl. 116—129)

In various instruments it is desirable to provide a pointer or other indicator which moves with great ease during the normal operation of the instrument but, nevertheless, resists movement due to vibrations and the like. For example, in maximum demand meters for indicating the maximum rate of power consumption in an electric circuit, the meter element directly controls an indicator which in turn pushes a freely pivotal indicator which should move easily and not be subjected to displacement by vibrations or intentional jolts. It should move easily so that the pusher indicator can move it to the correct value without unnecessary loss of power. It should resist displacement because it may be pushed to its maximum position early in the billing period, and may be subjected to a great deal of vibration between that time and the time when the meter is read. Furthermore, there are unfortunately some dishonest persons who might endeavor to find a particular way to jar the meter housing in order to jar the maximum demand pointer to a lower reading.

At least one attempt has been made heretofore to meet the problem by a grease-dampened pointer, but that has not been wholly satisfactory because changes in viscosity of the grease used for dampening the movement or vibration of the indicator caused variations in the operating characteristics and also necessitated an undesirable vertical disposition of the indicator shaft so that the grease would not run out when warm or moderately hot temperatures were encountered.

According to the present invention, the shaft is horizontally disposed and a grease is used which is of substantially constant viscosity throughout a wide range of temperatures, including all temperatures encountered in service, so that it never flows away from its original and proper location.

Additional objects and advantages will be apparent from the following description and from the drawings in which.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

The meter chosen for illustration is a combined watt-hour integrating meter and a maximum demand meter. The watt-hour meter element runs the integrating register 11. The demand meter unit controls the indicating pointer 12. This indicator is provided with a pusher lug 13 which engages a maximum demand pointer 14 with which the present invention is primarily concerned.

Figure 1:
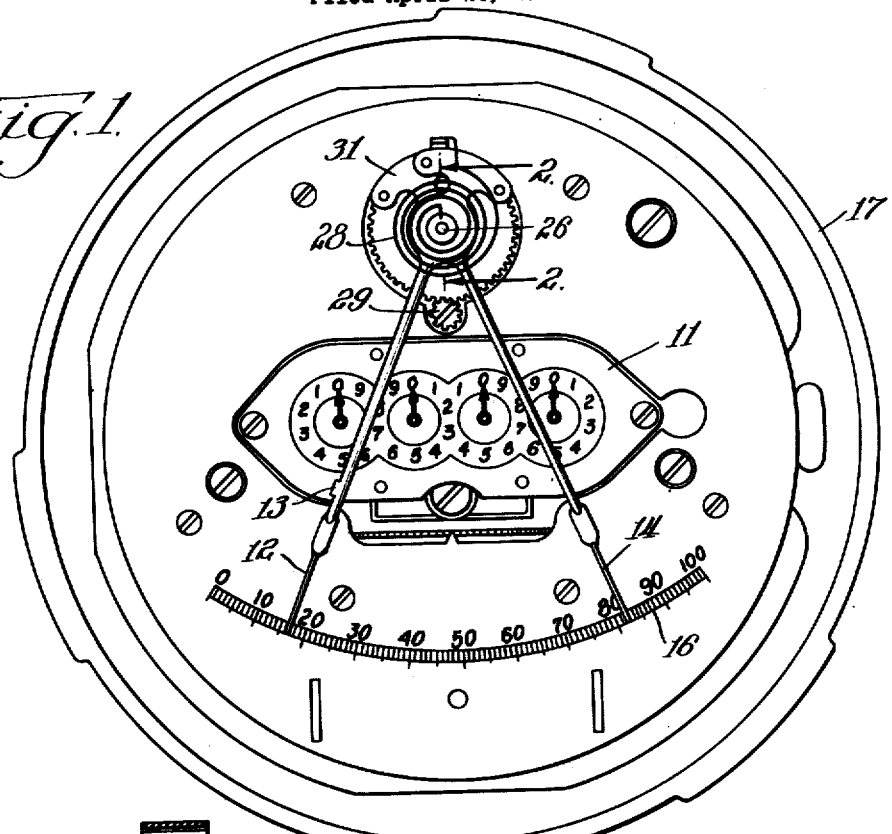
Figure 1 is a face view of a meter embodying the present invention.

As seen in Fig. 1 the maximum demand pointer 14 has been pushed far along the scale 16 by the indicator or pusher 12, and the pusher has been receded to a lower value indicating a decreased demand. Thus the maximum demand pointer 14 remains at the position of maximum demand until it is read by the meter reader at the end of a billing period and then turned back to zero or to the momentary position of the indicator 12. It is evident that a very desirable characteristic for the meter is that the maximum demand pointer has complete stability. In other words, it should remain dependably in any position to which it is moved by the indicator 12 so that it will not be moved from this position by accidental vibrations or by intentional jolting of the meter base 17.

Figure 2:
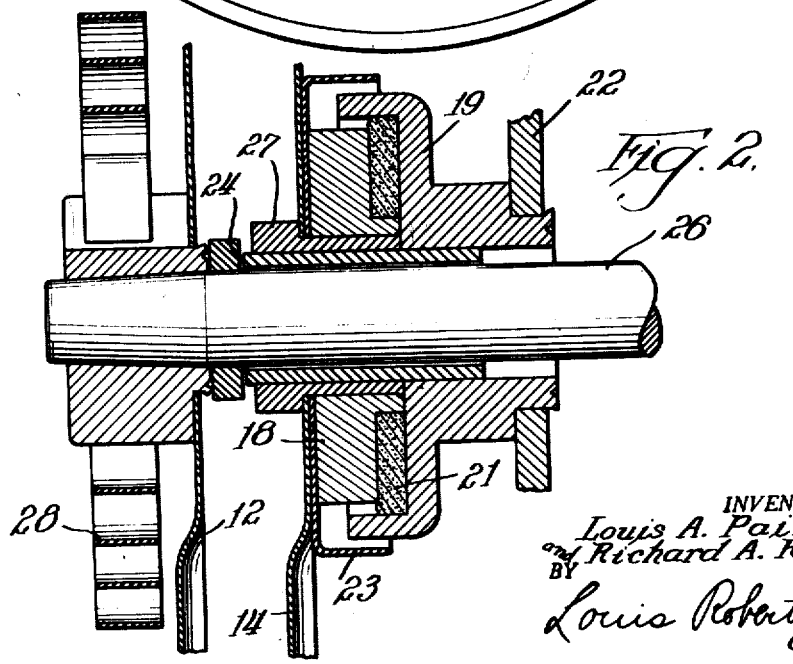
Fig. 2 is a fragmentary, vertical, sectional view taken approximately on the line 2—2 of Fig. 1.

According to the present invention, this stability or dependable resistance to displacement is provided by the damping unit shown in Fig. 2. In this figure, the maximum demand pointer 14 carries a bushing 18 which projects into a cup 19 but moves freely with respect thereto except insofar as relative movement is opposed by an intervening body of grease 21. Of course, there is inevitably some bearing friction but that is reduced as much as is practical and may be ignored for the purpose of present considerations. The cup 19 is stationarily mounted. It may, for example, be staked to meter plate 22 which may be a part of the frame of the meter. Another cup 23 may desirably be provided, serving mainly as dust guard. In the illustrated form it is rigidly carried with the pointer 14 and bushing 18 so as to rotate with them.

A bearing sleeve 24 is preferably provided for the rotating parts. It may be carried rigidly by the cup 19 and, therefore, be rigid with the frame member 22. It serves as a bearing for the pointer 14 and associated rotating parts but has wide clearance around the indicator shaft or meter shaft 26 which carries the indicator 12. To ensure smoothness and ease of rotation of the maximum demand pointer 14 on bearing 24, this pointer and its associated parts are carried by a bearing sleeve 27 which is rotatably carried by the bearing member 24.

It may be observed that the indicator 12 is urged toward a zero position by a meter spring means not shown and a hair spring 28, the latter preferably being adjustable by an adjustment device 29 (omitted in Fig. 2 for clarity).

The grease 21 may be any material having a suitable viscosity and which over a long period of years will remain of substantially constant viscosity throughout the range of temperatures which will be commercially encountered. It is especially important that at no temperature to be encountered should the grease or dampening material soften sufficient to flow out of place. In this connection it is noted that the meter case may sometimes be placed in a hot tropical or desert sun and heat may be generated at the same time within the casing by the meter elements. The term "temperatures commercially encountered" is intended to include even rare operating conditions. Of course, the grease need not withstand the accidental temperatures, such as might result from a fire. An adequate range is probably —20° F. to 250° F.

At the present time a silicone grease is preferred, and the preferred grade is that sold as "Stop Cock Grease" by the Dow Corning Corporation of Midland, Michigan. This grease has been found to meet all of the requirements and its viscosity, which remains substantially constant throughout the temperature ranges commercially encountered seems to be ideal. The pointer adequately resists displacement by vibration or jarring although the grease seems to add substantially no resistance to movement of the pointer 14 at the slow speeds at which it is moved by indicator or pusher 12. Of course, it must add some resistance but it is well within the permissible values. The grease shows no tendency to flow out of place at the highest temperatures commercially encountered, and the horizontal positioning of the shaft is therefore entirely safe. Likewise, at the highest temperatures commercially encountered, the pointer 14 is adequately stabilized against improper displacement. It should be noted that the pointer 14 is provided with a counterweight 31 which preferably exactly balances it about the axis of shaft 26.

Very little grease is required. It is not even necessary that the chamber between bushing 18 and cup 19 be filled. In Fig. 2, the parts have been shown greatly enlarged.

It would, of course, be very difficult to permit free rotation of the pointer 14 without also having some end play in its bearings. With a horizontal axis, gravity has no tendency to eliminate this end play. It might have been supposed that such end play would cause a separation of the grease from one of the chamber walls and that upon such separation its value as a dampening agent would be destroyed. It has been found, however, that with such reasonable end play as would be consistent with good instrument practice, the grease will continue to cling to both the cup 19 and the bushing 18 and will have sufficient cohesiveness to stretch out in an axial direction rather than to separate within itself. Any other non-drying liquid having the indicated characteristics in the temperature range indicated as to viscosity, adhesiveness, cohesiveness and immunity to chemical change as used could be used in place of the grease.

From the foregoing it is seen that an instrument indicator is provided together with a dampening device which is suitable for use with a horizontal axis and which maintains constant operating characteristics throughout a wide range of temperatures. The dampening device, using silicone grease, has substantially no effect on the normal operation of the indicator because of extremely low resistance to slow movement, but it satisfactorily and dependably stabilizes the indicator against displacement by vibration or jolts.

We claim:

1. A dampening unit for a member rotatable about a generally horizontal axis including a surface associated with said member to rotate therewith, a stationary surface facing the first-named surface and spacer therefrom, and a body comprising silicone grease engaging both the said surfaces; the space between the surfaces occupied by the viscous liquid opening downwardly whereby the grease would be free to flow from the chamber if its viscosity permitted it to flow by gravity, and said grease having viscosity characteristics, at all temperatures between approximately 250° F. above 0 and 20° F. below 0, preventing flow by gravity and causing no appreciable inaccuracy in the pointer positioning.

2. A dampening unit for a member rotatable about a generally horizontal axis including a surface associated with said member to rotate therewith, a stationary surface facing the first-named surface and spaced therefrom, and a body comprising viscous liquid engaging both the said surfaces; the space between the surfaces occupied by the viscous liquid opening downwardly whereby the viscous liquid would be free to flow from the chamber if its viscosity permitted it to flow by gravity, and said viscous liquid having viscosity characteristics, at all temperatures between approximately 250° F. above 0 and 20° F. below 0, preventing flow by gravity and causing no appreciable inaccuracy in the pointer positioning.

3. A maximum demand meter including a pusher, a maximum demand pointer including a hub portion rotatably mounted about a horizontal axis and disposed to be driven by the pusher to a position of maximum demand and left there, and dampening means for resisting displacement of the pointer by vibration or mechanical shocks including a stationary surface, a surface spaced therefrom which rotates with the hub portion, the space between said surfaces being open peripherally to a space larger than said first-named space, and a body comprising silicone stop cock grease between said surfaces and held in place by its viscosity but for which it would be free to run out, said pointer and the parts moving therewith outside of the bearing therefor being free from contact with any stationary solid other than the grease.

4. A maximum demand meter including a pusher, a maximum demand pointer including a hub portion rotatably mounted about a horizontal axis and disposed to be driven by the pusher to a position of maximum demand and left there, and dampening means, for resisting displacement of the pointer by vibration or mechanical jars, cooperating with a surface associated with said pointer to rotate therewith, and including a stationary surface facing the first-named surface and spaced therefrom and a body comprising viscous liquid engaging both the said surfaces, the space between the surfaces occupied by the viscous liquid opening downwardly whereby the viscous liquid would be free to flow from the chamber if its viscosity permitted it to flow by gravity, and said viscous liquid having viscosity characteristics, at all temperatures between approximately 250° F. above 0 and 20° F. below 0, preventing flow by gravity and causing no appreciable inaccuracy in the pointer positioning.

5. A maximum demand meter including a pusher, a maximum demand pointer including a hub portion rotatably mounted about a horizontal axis and disposed to be driven by the pusher to a position of maximum demand and left there, and dampening means, for resisting displacement of the pointer by vibration or mechanical jars, co-operating with a surface associated with said pointer to rotate therewith, and including a stationary surface facing the first-named surface and spaced therefrom and a body comprising silicone grease engaging both the said surfaces, the space between the surfaces occupied by the grease opening downwardly whereby the grease would be free to flow from the chamber if its viscosity permitted it to flow by gravity, and said grease having viscosity characteristics, at all temperatures between approximately 250° F. above 0 and 20° F. below 0, preventing flow by gravity and causing no appreciable inaccuracy in the pointer positioning.

LOUIS A. PAINE.
RICHARD A. ROAD.

REFERENCES CITED

The following references are of record in the file of this patent:

UNITED STATES PATENTS

| Number | Name | Date |
|---|---|---|
| 1,114,691 | Herz | Oct. 20, 1914 |
| 1,166,719 | Shebol et al. | Jan. 4, 1916 |
| 1,428,225 | Fulton | Sept. 5, 1922 |
| 1,461,091 | Henley | July 10, 1923 |
| 1,462,141 | Leitch | July 17, 1923 |
| 1,526,306 | Sprenger | Feb. 10, 1925 |
| 2,149,374 | Wellman | Mar. 7, 1939 |
| 2,171,183 | Lamb | Aug. 29, 1939 |
| 2,182,076 | Elmer | Dec. 5, 1939 |

OTHER REFERENCES

Article from Nov. 1944 issue of Modern Plastics entitled "Silicones—High Polymeric Substances," by S. L. Bass et al.

Modern Plastics, Nov. 1944, pages 124, 125, 126, 212 and 214.